(12) United States Patent
Chesky

(10) Patent No.: US 10,227,526 B2
(45) Date of Patent: Mar. 12, 2019

(54) OIL THINNING COMPOSITIONS AND RETRIEVAL METHODS

(71) Applicant: BIOSPAN TECHNOLOGIES, INC., Ballwin, MO (US)

(72) Inventor: Sheldon R Chesky, Chesterfield, MO (US)

(73) Assignee: BIOSPAN TECHNOLOGIES, INC., Ballwin, MO (US)

(*) Notice: Subject to any disclaimer, the term of this patent is extended or adjusted under 35 U.S.C. 154(b) by 60 days.

(21) Appl. No.: 15/132,632

(22) Filed: Apr. 19, 2016

(65) Prior Publication Data

US 2016/0251572 A1    Sep. 1, 2016

Related U.S. Application Data

(62) Division of application No. 13/599,842, filed on Aug. 30, 2012, now Pat. No. 9,328,284.

(60) Provisional application No. 61/543,185, filed on Oct. 4, 2011.

(51) Int. Cl.
| | |
|---|---|
| C09K 8/82 | (2006.01) |
| C09K 8/58 | (2006.01) |
| E21B 43/16 | (2006.01) |
| C09K 8/524 | (2006.01) |
| C09K 8/54 | (2006.01) |

(52) U.S. Cl.
CPC .............. *C09K 8/82* (2013.01); *C09K 8/524* (2013.01); *C09K 8/54* (2013.01); *C09K 8/58* (2013.01); *E21B 43/16* (2013.01)

(58) Field of Classification Search
CPC . C09K 8/524; C09K 8/54; C09K 8/58; C09K 8/82; E21B 43/16
See application file for complete search history.

(56) References Cited

U.S. PATENT DOCUMENTS

| | | | |
|---|---|---|---|
| 3,867,262 A | 2/1975 | Rockland et al. | 203/41 |
| 3,954,141 A | 5/1976 | Allen et al. | 166/403 |
| 4,004,636 A | 1/1977 | Brown et al. | 166/401 |
| 4,007,785 A | 2/1977 | Allen et al. | 166/272.1 |
| 4,026,358 A | 5/1977 | Allen | 166/261 |
| 4,033,784 A | 7/1977 | Lawson et al. | 134/20 |
| 4,071,458 A | 1/1978 | Allen | 507/202 |
| 4,800,957 A | 1/1989 | Stevens, Jr. et al. | 166/268 |
| 4,964,615 A | 10/1990 | Mueller et al. | 252/999.999 |
| 5,117,907 A | 6/1992 | Hsu | 166/266 |

(Continued)

FOREIGN PATENT DOCUMENTS

| | | |
|---|---|---|
| GB | 2459470 A | 10/2009 |
| WO | WO/2004/037965 | 5/2004 |

(Continued)

OTHER PUBLICATIONS

Hwang, R. J. et al. (2000) "Mitigation of asphaltics deposition during CO2 flood by enhancing CO2 solvency with chemical modifiers," *Organic Geochemistry* 31(12), 1451-1462.

(Continued)

*Primary Examiner* — Alicia Bland
(74) *Attorney, Agent, or Firm* — Medlen & Carroll, LLP

(57) ABSTRACT

The present invention relates to compositions of plant oil-based biodegradable crude oil thinning fluids having a performance especially suitable to reducing crude oil viscosity in extraction and retrieval operations.

5 Claims, 7 Drawing Sheets

(56) References Cited

U.S. PATENT DOCUMENTS

| | | |
|---|---|---|
| 5,139,088 A | 8/1992 | De Boer et al. .............. 166/267 |
| 5,401,325 A | 3/1995 | Mihelic et al. ................. 134/39 |
| 5,690,176 A | 11/1997 | Delbianco et al. ........... 166/304 |
| 5,811,380 A | 9/1998 | Weitz ............................ 510/175 |
| 7,334,641 B2 | 2/2008 | Castellano .................... 166/371 |
| 2006/0142172 A1 | 6/2006 | Cioletti et al. ................ 510/365 |
| 2007/0007004 A1 | 1/2007 | Castellano .................... 166/371 |
| 2007/0062698 A1 | 3/2007 | Smith et al. ................... 166/304 |
| 2007/0124990 A1 | 6/2007 | Chheda ............................ 44/330 |
| 2007/0295640 A1 | 12/2007 | Tan et al. ......................... 507/90 |
| 2008/0139418 A1 | 6/2008 | Cioletti et al. ................ 507/261 |
| 2009/0078415 A1 | 3/2009 | Fan et al. ...................... 166/267 |
| 2009/0236899 A1 | 9/2009 | Geisler .......................... 166/266 |
| 2009/0250381 A1 | 10/2009 | Fan et al. ...................... 208/337 |
| 2009/0281004 A1 | 11/2009 | Ali et al. ....................... 507/219 |
| 2010/0293723 A1* | 11/2010 | Racette ................. C11D 1/345 8/142 |

FOREIGN PATENT DOCUMENTS

| | | |
|---|---|---|
| WO | WO/2006/047745 | 5/2006 |
| WO | WO/2009/136364 | 11/2009 |
| WO | WO/2010/124030 | 10/2010 |

OTHER PUBLICATIONS

Simonsen, J. L. (1947) *The Terpenes*, vol. 1, 2nd ed., Cambridge University Press.

PCT International Search Report of International Application No. PCT/US2012/053328 dated Dec. 10, 2012.

* cited by examiner

|  | WELL 41 | WELL 41 | WELL 41 |
|---|---|---|---|
| START OF TEST | 2/13/09 23:02 | 2/16/09 11:30 | 2/17/09 12:35 |
| END OF TEST | 2/14/09 9:12 | 2/17/09 8:55 | 2/18/09 9:55 |
|  |  |  |  |
| BSW % | 96.8 | 97 | 95.3 |
| BGLPD | 71.2 | 182.7 | 145.6 |
| BWPD | 68.9 | 177.2 | 138.7 |
| BOPD | 2.3 | 5.5 | 6.8 |
| API GRAVLY |  | 16.3 | 15.9 |
| WATER API | 9.7 | 10.3 | 9.8 |

|  | WELL 41<br>2/13/09 23:02<br>2/14/09 9:12 | WELL 41<br>2/16/09 11:30<br>2/17/09 8:55 | WELL 41<br>2/17/09 12:35<br>2/18/09 9:55 | % CHANGES |
|---|---|---|---|---|
| BSW % | 96.8 | 97 | 95.3 |  |
| BGLPD | 71.2 | 182.7 | 145.6 | 104% |
| BWPD | 68.9 | 177.2 | 138.7 | 101% |
| BOPD | 2.3 | 5.5 | 6.8 | 196% |
| API GRAVLY |  | 16.3 | 15.9 |  |
| WATER API | 9.7 | 10.3 | 9.8 |  |

|  | WELL 47 | WELL 47 |
|---|---|---|
| START OF TEST | 2/13/09 16:15 | 2/16/09 11:35 |
| END OF TEST | 2/14/09 9:18 | 2/17/09 8:34 |
|  |  |  |
| BSW % | 96.5 | 96 |
| BGLPD | 64.5 | 82.4 |
| BWPD | 62.2 | 79.1 |
| BOPD | 2.3 | 3.3 |
| API GRAVLY | 13.5 | 15.7 |
| WATER API | 10 | 10.1 |

|  | WELL 47<br>2/13/09 16:15<br>2/14/09 9:18 | WELL 47<br>2/16/09 11:35<br>2/17/09 8:34 | % CHANGES |
|---|---|---|---|
| BSW % | 96.5 | 96 |  |
| BGLPD | 64.5 | 82.4 | 28% |
| BWPD | 62.2 | 79.1 | 27% |
| BOPD | 2.3 | 3.3 | 43% |
| API GRAVLY | 13.5 | 15.7 | 16% |
| WATER API | 10 | 10.1 |  |

|                | WELL 72        | WELL 72        |
|----------------|----------------|----------------|
| START OF TEST  | 2/13/09 14:00  | 2/16/09 12:10  |
| END OF TEST    | 2/14/09 9:05   | 2/17/09 9:04   |
|                |                |                |
| BSW %          | 98             | 97.5           |
| BGLPD          | 93.2           | 129.8          |
| BWPD           | 91.4           | 126.5          |
| BOPD           | 1.9            | 3.2            |
| API GRAVLY     |                | 15.6           |
| WATER API      | 9.8            | 10             |

|              | WELL 72<br>2/13/09 14:00<br>2/14/09 9:05 | WELL 72<br>2/16/09 12:10<br>2/17/09 9:04 | % CHANGES |
|--------------|-----------|-----------|------|
| BSW %        | 98        | 97.5      |      |
| BGLPD        | 93.2      | 129.8     | 39%  |
| BWPD         | 91.4      | 126.5     | 38%  |
| BOPD         | 1.9       | 3.2       | 68%  |
| API GRAVLY   |           | 15.6      |      |
| WATER API    | 9.8       | 10        |      |

| | PEAK | INTENSITY | CORR. INTENSITY | BASE (H) | BASE (L) | AREA | CORR. AREA |
|---|---|---|---|---|---|---|---|
| 1 | 798.53 | 93.542 | 4.157 | 815.89 | 792.74 | 0.334 | 0.169 |
| 2 | 887.26 | 80.15 | 17.567 | 906.54 | 860.25 | 1.731 | 1.349 |
| 3 | 914.26 | 92.997 | 3.505 | 925.83 | 908.47 | 0.361 | 0.104 |
| 4 | 966.34 | 95.015 | 0.943 | 970.19 | 947.05 | 0.401 | 0.054 |
| 5 | 977.91 | 95.418 | 0.896 | 991.41 | 972.12 | 0.312 | 0.026 |
| 6 | 1016.49 | 90.397 | 6.067 | 1031.92 | 993.34 | 0.965 | 0.401 |
| 7 | 1049.28 | 91.323 | 3.374 | 1056.99 | 1033.85 | 0.703 | 0.189 |
| 8 | 1068.56 | 90.72 | 3.063 | 1087.85 | 1058.92 | 1.01 | 0.175 |
| 9 | 1101.35 | 88.004 | 1.709 | 1105.21 | 1089.78 | 0.704 | 0.069 |
| 10 | 1116.78 | 82.868 | 8.385 | 1138 | 1107.14 | 1.466 | 0.43 |
| 11 | 1155.36 | 92.585 | 4.635 | 1182.36 | 1139.93 | 0.877 | 0.381 |
| 12 | 1203.58 | 91.84 | 3.381 | 1211.30 | 1184.29 | 0.612 | 0.154 |
| 13 | 1240.23 | 62.905 | 32.370 | 1305.81 | 1213.23 | 5.528 | 3.869 |
| 14 | 1371.39 | 84.828 | 12.137 | 1386.82 | 1338.60 | 1.36 | 0.853 |
| 15 | 1438.90 | 89.641 | 2.374 | 1444.68 | 1417.68 | 0.848 | 0.163 |
| 16 | 1450.47 | 89.944 | 1.721 | 1473.62 | 1446.61 | 0.776 | 0.072 |
| 17 | 1643.35 | 93.922 | 5.307 | 1653 | 1635.64 | 0.281 | 0.223 |
| 18 | 1739.79 | 73.178 | 25.650 | 1770.65 | 1716.65 | 2.642 | 2.371 |
| 19 | 2833.43 | 93.21 | 2.829 | 2846.93 | 2777.50 | 0.94 | 0.184 |
| 20 | 2856.58 | 94.258 | 0.546 | 2862.36 | 2848.86 | 0.323 | 0.018 |
| 21 | 2889.37 | 91.389 | 0.947 | 2897.08 | 2864.29 | 1.124 | 0.11 |
| 22 | 2916.37 | 90.535 | 2.582 | 2851.09 | 2899.01 | 1.823 | 0.357 |
| 23 | 2964.59 | 93.709 | 2.731 | 3030.17 | 2953.02 | 1.223 | 0.383 |

| | PEAK | INTENSITY | CORR. INTENSITY | BASE (H) | BASE (L) | AREA | CORR. AREA |
|---|---|---|---|---|---|---|---|
| 1 | 796.60 | 93.285 | 4.158 | 815.89 | 792.74 | 0.375 | 0.195 |
| 2 | 887.26 | 80.491 | 16.943 | 906.54 | 860.25 | 1.843 | 1.396 |
| 3 | 914.26 | 93.418 | 3.066 | 927.76 | 908.47 | 0.361 | 0.089 |
| 4 | 966.34 | 95.684 | 0.688 | 972.12 | 943.19 | 0.435 | 0.042 |
| 5 | 1018.41 | 91.181 | 3.222 | 1028.06 | 993.34 | 0.867 | 0.186 |
| 6 | 1049.28 | 84.5 | 7.522 | 1060.85 | 1028.99 | 1.607 | 0.534 |
| 7 | 1070.49 | 89.853 | 0.608 | 1074.35 | 1062.78 | 0.51 | 0.023 |
| 8 | 1085.92 | 89.219 | 0.273 | 1089.78 | 1076.28 | 0.648 | 0.01 |
| 9 | 1097.50 | 88.571 | 0.892 | 1105.21 | 1091.71 | 0.688 | 0.035 |
| 10 | 1116.78 | 87.134 | 5.021 | 1138 | 1107.14 | 1.151 | 0.236 |
| 11 | 1155.36 | 93.901 | 3.643 | 1182.36 | 1139.93 | 0.714 | 0.28 |
| 12 | 1203.58 | 93.682 | 2.619 | 1211.30 | 1184.29 | 0.478 | 0.122 |
| 13 | 1240.23 | 72.814 | 23.155 | 1300.02 | 1213.23 | 4.6 | 3.144 |
| 14 | 1373.32 | 86.606 | 9.295 | 1386.82 | 1340.53 | 1.338 | 0.656 |
| 15 | 1438.90 | 89.737 | 2.64 | 1446.61 | 1417.68 | 0.959 | 0.179 |
| 16 | 1643.35 | 94.052 | 4.998 | 1653 | 1635.64 | 0.284 | 0.212 |
| 17 | 1741.72 | 83.535 | 16.189 | 1770.65 | 1699.29 | 2.122 | 2.033 |
| 18 | 2835.36 | 93.314 | 2.507 | 2846.93 | 2773.64 | 1.007 | 0.166 |
| 19 | 2889.37 | 90.998 | 1.412 | 2902.87 | 2848.86 | 1.796 | 0.198 |
| 20 | 2916.37 | 90.758 | 1.755 | 2949.16 | 2904.80 | 1.558 | 0.237 |
| 21 | 2966.52 | 92.182 | 4.049 | 3030.17 | 2951.09 | 1.48 | 0.51 |

| | PEAK | INTENSITY | CORR. INTENSITY | BASE (H) | BASE (L) | AREA | CORR. AREA |
|---|---|---|---|---|---|---|---|
| 1 | 798.53 | 94.434 | 4.196 | 815.89 | 792.74 | 0.244 | 0.161 |
| 2 | 887.26 | 82.394 | 15.953 | 906.54 | 860.25 | 1.402 | 1.111 |
| 3 | 911.26 | 91.111 | 3.274 | 929.69 | 908.47 | 0.278 | 0.099 |
| 4 | 956.69 | 97.807 | 1.081 | 968.27 | 945.12 | 0.15 | 0.048 |
| 5 | 1015.49 | 95.529 | 2.563 | 1035.77 | 999.13 | 0.486 | 0.179 |
| 6 | 1051.20 | 96.901 | 0.773 | 1056.99 | 1043.49 | 0.162 | 0.025 |
| 7 | 1070.49 | 96.926 | 0.396 | 1074.35 | 1053.92 | 0.188 | 0.018 |
| 8 | 1115.78 | 02.422 | 3324 | 1030.29 | 1076.28 | 1.244 | 0.346 |
| 9 | 1147.65 | 92.974 | 0.405 | 1149.57 | 1135.07 | 0.343 | 0.006 |
| 10 | 1168.86 | 92.349 | 1.144 | 1184.29 | 1163.08 | 1.647 | 0.061 |
| 11 | 1197.79 | 92.931 | 2.065 | 1217.08 | 1183.22 | 0.824 | 0.143 |
| 12 | 1240.23 | 87.704 | 8.243 | 1296.16 | 1219.01 | 2.039 | 0.807 |
| 13 | 1325.10 | 97.806 | 0.36 | 1336.67 | 1319.31 | 0.157 | 0.022 |
| 14 | 1357.89 | 96.634 | 0.402 | 1361.74 | 1338.60 | 0.275 | 0.05 |
| 15 | 1375.25 | 93.053 | 4.42 | 1386.82 | 1361.74 | 0.551 | 0.27 |
| 16 | 1435.04 | 88.799 | 5.324 | 1446.61 | 1417.68 | 0.946 | 0.298 |
| 17 | 1643.35 | 95.008 | 4.981 | 1553 | 1635.64 | 0.211 | 0.21 |
| 18 | 1741.72 | 83.423 | 16.932 | 1770.65 | 1716.65 | 1.421 | 1.502 |
| 19 | 2854.65 | 89.765 | 3.612 | 2866.22 | 2779.42 | 1.685 | 0.303 |
| 20 | 2875.86 | 91.867 | 0.115 | 2877.79 | 2863.15 | 0.346 | 0.005 |
| 21 | 2922.16 | 84.816 | 7.842 | 2949.16 | 2877.79 | 3.581 | 0.16 |
| 22 | 2962.66 | 92.565 | 1.596 | 2995.45 | 2953.02 | 0.933 | 0.082 |
| 23 | 3003.95 | 96.745 | 1.326 | 3035.96 | 2997.38 | 0.332 | 0.088 |

OIL THINNING COMPOSITIONS AND RETRIEVAL METHODS

CROSS REFERENCE TO RELATED APPLICATIONS

This application claims priority under 35 U. S. C. § 119 from Provisional Application Ser. No. 61/543,185, filed Oct. 4, 2011, the disclosure of which is incorporated herein by reference.

FIELD OF THE INVENTION

The present invention relates to compositions of plant oil-based biodegradable crude oil thinning fluids having a performance especially suitable to reducing crude oil viscosity in extraction and retrieval operations.

BACKGROUND OF THE INVENTION

With ever increasing environmental pressures being placed on the oil industry it has become necessary to develop and employ products and methods of well treatment which can perform in a timely fashion, be cost effective and conform to the stricter controls now in place.

It is known in the art that oil fields can become extremely viscous due to a heavy concentration of paraffin, asphaltene, or a combination of both and other organics in the formation. Paraffin plugs stop oil recovery completely until they are cleared. Indeed, these deposits can result in reduced oil production, fouling of flow lines and down hole piping, under deposit corrosions, reductions in gas production, and increased pumping costs due to pumping a high viscosity fluid. Each of these conditions individually can result in lost revenue. The combination of two or more of these conditions will lead to a significant revenue loss to the well owner, as well as additional income spent due to clean up of oil spills caused by under deposit corrosion or other flow restrictions. Moreover, the differing oxygen concentrations (and other corrosive compounds which may be present and intensify the corrosiveness of the oil) in bulk oil with respect to the oxygen levels extant beneath the deposit result in localized, rapid corrosion of the piping and eventual oil leaks. What is needed is a environmentally friendly, recyclable composition and methods for reducing the viscosity of crude oils in the field to facilitate extraction.

SUMMARY OF THE INVENTION

The present invention relates to compositions of plant oil-based biodegradable crude oil thinning fluids, having a performance especially suitable to reducing crude oil viscosity in extraction and retrieval operations.

In one embodiment, the present invention comprises formulations and methods to enhance recovery from an oil well field. In one embodiment, the applicant's method supplies a mixture of terpenoid compounds derived from d-limonene, soy methyl esters, and non-toxic glycol ether esters reacted in a specific sequence with inorganic catalyst to yield a mixture the effectively reduces the viscosity of crude oil and oil sands. In one embodiment, the method continues the extraction of materials from the oil well or oil sands with the mixture of -limonene, soy methyl esters, and non-toxic glycol ether esters into the oil well or sands reducting the material's viscosity. In one embodiment, the method recirculates the oil well, and then returns the oil well to service enabling extraction of additional oil with reduced effort.

In one embodiment, the invention relates to a method to recover oil from an oil well, comprising the steps of: a) providing a formulation comprising: one or more terpenoid compounds, soy methyl esters, and glycol ether esters; b) introducing a said formulation into said oil well; and c) recovering a mixture from said oil well, said mixture comprising at least a portion of said formulation and oil from said oil well. In one embodiment, the invention relates to a method to recover oil from an oil well, comprising the steps of: a) providing a formulation comprising: one or more terpenoid compounds, soy methyl esters, and glycol ether esters; b) introducing a first portion of said formulation into said oil well; and c) recovering a mixture from said oil well, said mixture comprising at least a portion of said formulation and oil from said oil well. In one embodiment, said oil well is not producing oil using standard extraction techniques. In one embodiment, said oil well is producing oil using standard extraction techniques. In one embodiment, the method further comprises, prior to said introducing of step b), the step of discontinuing extraction of materials from said oil well by said standard extraction techniques. In one embodiment, the method further comprises, after said recovering of step c), the step of recirculating said oil well. In one embodiment, the method further comprises, after said recirculating, the step of returning said oil well to service and extracting oil by standard extraction techniques. In one embodiment, said formulation comprises approximately 30-35 or even 30-45 weight percent of said one or more terpenoid compounds, approximately 30-35 or even 30-45 weight percent of said methyl esters, and the balance of weight percent of said glycol ether esters. In one embodiment, said one or more terpenoid compounds comprise one or more of pinene, menthene, menthane, and limonene. In one embodiment, said one or more terpenoid compounds comprises at least D-limonene. In one embodiment, the present invention contemplates making monoterpenes from soybean oil and their derivatives. In one embodiment, the method further comprises after said recirculating step the steps of: introducing a second portion of said formulation into said oil well. In one embodiment, said second portion is introduced under pressure (e.g. greater than ambient atmospheric pressure). In another embodiments, different pressures are used over time (e.g. 24 to 72 hours). In one embodiment, said first pressure is between about 200 psi and about 1000 psi, and wherein said second pressure is between about 400 psi and about 1200 psi, and wherein said third pressure is between about 600 psi and about 1400 psi.

In one embodiment, the invention relates to a formulation comprising one or more terpenoid compounds, soy methyl esters, and glycol ether esters. In one embodiment, the formulation comprises approximately 30-35 weight percent of said one or more terpenoid compounds, approximately 30-35 weight percent of said methyl esters, and about 30 weight percent of said glycol ether esters. In one embodiment, the formulation is substantially non-toxic.

In one embodiment, the invention relates to a method for producing a formulation to dispose in an oil well to enhance recovery therefrom, comprising: a. providing i) a solution of one or more terpenoid compounds, ii) soy methyl esters, iii) glycol ether esters, iv) a first inorganic catalyst, v) a second inorganic catalyst, and vi) a reactor; b. placing said solution of one or more terpenoid compounds in said reactor; c. suspending said first inorganic catalyst in said solution in said reactor; d. adding said soy methyl esters to the reactor to create a first reaction mixture; e. agitating said first reaction mixture; and f. adding said glycol ether esters to said reaction mixture in the presence of said second inorganic catalyst to create a second reaction mixture; and g. agitating said second reaction mixture so as to produce a formulation for recovering oil. In one embodiment, said reactor is a stainless steel reactor. In one embodiment, said reactor is a glass reactor with an added source of steel. In one embodiment, said reactor is a plastic reactor with an added source of steel. In one embodiment, agitating comprises stirring the mixture for at least 30 minutes at 1700-3500 rpm. In one embodiment, said reactor is grounded. In one embodiment, agitating comprises stirring the mixture until the solution is clear. In one embodiment, the invention is the composition produced according to the method above. In one embodiment, the composition can be used to reduce the viscosity of oil in pipes. In one embodiment, the composition can be used to increase the extraction of oil from oil sands. In one embodiment, the composition is substantially non-toxic.

In one embodiment the invention relates to a method to enhance recovery from an oil well, comprising the steps of: supplying a mixture of compounds comprising: a mixture of one or more terpenoid compounds, soy methyl esters, and glycol ether esters; discontinuing the extraction of materials from said oil well; disposing said mixture of compounds into said oil well; recirculating said oil well; returning said oil well to service. In one embodiment, said supplying a mixture of compounds further comprises supplying a mixture comprising about 30-35 or even 30-45 weight percent of said a mixture of one or more terpenoid compounds, about 30-35 or even 30-45 weight percent of said methyl esters, and the balance of weight percent of said glycol ether esters. In one embodiment, said one or more terpenoid compounds comprise one or more of pinene, menthene, menthane, and limonene. In one embodiment, said mixture of one or more terpenoid compounds comprises at least D-limonene. In one embodiment, the method further comprising after said recirculating step the steps of: injecting said mixture of compounds into said oil well using a first pressure, wherein said first pressure is greater than ambient atmospheric pressure; wherein said second pressure is greater than ambient atmospheric pressure; maintaining a third pressure in said well for 24 to 72 hours, wherein said third pressure is greater than ambient atmospheric pressure. In one embodiment, said first pressure is between about 200 psi and about 1000 psi, and wherein said second pressure is between about 400 psi and about 1200 psi, and wherein said third pressure is between about 600 psi and about 1400 psi.

In another embodiment, the invention relates to a formulation to dispose in an oil well to enhance recovery therefrom, comprising a mixture of mixture of compounds comprising a mixture of one or more terpenoid compounds, soy methyl esters, and glycol ether esters. In one embodiment, the mixture of compounds further comprises about 30-35 or even 30-45 weight percent of said a mixture of one or more terpenoid compounds, about 30-35 or even 30-45 weight percent of said methyl esters, and the balance of weight percent of said glycol ether esters.

In another embodiment, the invention relates to a method for producing a formulation to dispose in an oil well to enhance recovery therefrom, comprising: a) one or more terpenoid compounds, soy methyl esters, glycol ether esters, a first inorganic catalyst, a second inorganic catalyst, b) 30-35% weight by weight of the terpenoid compound limonene is placed in a reactor and said first inorganic catalyst is suspended in the solution of d-limonene; c) addition of 30-35% soy methyl esters to the reactor and subsequent agitation of the resulting mixture; and d) slow addition of glycol ether esters by weight to make up the balance of the mixture in the presence of said second inorganic catalyst and subsequent agitation of the solution. In one embodiment, said reactor is a stainless steel reactor. In one embodiment, said reactor is a glass reactor with an added source of steel. In one embodiment, said reactor is a plastic reactor with an added source of steel. In one embodiment, said first inorganic catalyst is a copper/iron catalyst. In one embodiment, agitation comprises stirring the mixture for at least 30 minutes at 1700-3500 rpm. In one embodiment, said reactor is grounded. In one embodiment, step d further comprises stirring the mixture until the solution is clear. In one embodiment, said second inorganic catalyst is a copper/iron catalyst. In one embodiment, the invention is the composition produced according to method described above. In all instances, the reactions are endothermic.

In one embodiment, the invention relates to crude oil thinning formulations including, but not limited to:

1. In one embodiment, a family of formulations which use the solvent discoveries and other organic compounds to increase the recovery or crude oil form the geologic formation, the reservoir, and the oil tar sands. In one embodiment, this includes the chemistry and methods of oil recovery in the tar sands and oil rock/shale. We have experimentally increased the yield of oil by up to 10 times, and maintained that flow for 6-12 weeks.

2. In one embodiment, viscosity reducers which work outside the oil molecule which allows for at least 80% recovery, more preferably at least 90% recovery, and most preferably up to 100% recovery of our formulations with either mechanical or simple low temperature distillation techniques. In one embodiment, charged particle theory using the outermost ring of electrons to separate the oil molecules, reducing the cohesive properties of oil.

3. In one embodiment, pipeline thinning agents which reduce the viscosity and the operating temperature requirements, and eliminate the need for corrosion preventatives, synthetic oil additions and sub-sequent separation, and readily allow for the addition of condensates, which can be separated and recovered though either physical mechanical separation or distillation.

4. In one embodiment, paraffin plug treatment agents to resume or restore flow.

In one embodiment, the invention relates to a method to improve oil flow from an oil pipe, comprising the steps of: a) providing a formulation comprising: one or more terpenoid compounds, soy methyl esters, and glycol ether esters; b) introducing a first portion of said formulation into said oil pipe; and c) recovering a mixture from said oil pipe, said mixture comprising at least a portion of said formulation and oil from said oil pipe. In one embodiment, the mixture can be added to oil field pipes in order to increase flow. In one embodiment, the mixture can be added to oil field pipes in order to clear a blockage. In one embodiment, the blockage comprises a paraffin plug. In one embodiment, the mixture comprises a paraffin plug treatment. In one embodiment, the pipes are buried. In one embodiment, the pipes are remotely located. In one embodiment, the pipes are exposed to extreme temperatures (e.g. −60° C. to +40° C.). In one embodiment, the pipes are exposed to very low temperatures. In one embodiment, the mixture is added to said oil pipe to enable the recovery of otherwise uncapturable oil.

In one embodiment, the invention relates to a method of separating the oil from the mixture. In one embodiment, a large portion of the mixture is substantially recovered. In one embodiment, the recovery of the mixture is at least 80%, and more preferably at least 90%. In one embodiment, the recovered mixture is substantially nontoxic. In one embodiment, the recovered mixture is nontoxic. In one embodiment, the recovered mixture is recovered though a combination of physical mechanical separation and distillation. In one embodiment, the recovered mixture is recovered though physical mechanical separation. In one embodiment, the recovered mixture is recovered though distillation. In one embodiment, the recovered mixture may reused in the same fashion as the original mixture with little or no reduction in performance.

In one embodiment, the invention relates to a method to recover oil from an oil sands, comprising the steps of: a) providing a formulation comprising: one or more terpenoid compounds, soy methyl esters, and glycol ether esters; b) introducing a first portion of said formulation into said oil sands; and c) recovering a mixture from said oil sands, said mixture comprising at least a portion of said formulation and oil from said oil sands. In one embodiment, said oil sands is not producing oil using standard extraction techniques. In one embodiment, said oil sands is producing oil using standard extraction techniques. In one embodiment, the method further comprises, prior to said introducing of step b), the step of discontinuing extraction of materials from said oil sands by said standard extraction techniques. In one embodiment, the method further comprises, after said recovering of step c), the step of recirculating said oil sands. In one embodiment, the method further comprises, after said recirculating, the step of returning said oil sands to service and extracting oil by standard extraction techniques. In one embodiment, said formulation comprises approximately 30-35 or even 30-45 weight percent of said one or more terpenoid compounds, approximately 30-35 or even 30-45 weight percent of said methyl esters, and the balance of weight percent of said glycol ether esters. In one embodiment, said one or more terpenoid compounds comprise one or more of pinene, menthene, menthane, and limonene. In one embodiment, one or more terpenoid compounds comprises at least D-limonene. In one embodiment, further comprises after said recirculating step the steps of: introducing a second portion of said formulation into said oil sands using a first pressure, wherein said first pressure is greater than ambient atmospheric pressure; wherein said second pressure is greater than ambient atmospheric pressure; maintaining a third pressure in said well for 24 to 72 hours, wherein said third pressure is greater than ambient atmospheric pressure. In one embodiment, said first pressure is between about 200 psi and about 1000 psi, and wherein said second pressure is between about 400 psi and about 1200 psi, and wherein said third pressure is between about 600 psi and about 1400 psi. In one embodiment, the mixture is added to oil sands to enable the recovery of otherwise uncapturable oil.

Definitions

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Asphalt is a black bituminous material used for paving roads or other areas; usually spread over crushed rock. Asphalt is also a dark bituminous substance found in natural beds and as residue from petroleum distillation; comprised mainly of hydrocarbons. Asphalt is also a mixed asphalt and crushed gravel or sand; used especially for paving but also for roofing.

Asphalts, as used herein, include cementitious materials in which the predominating constituents are bitumens that occur in nature or are obtained in petroleum processing. Bitumen is a term which encompasses cementitious substances, natural or manufactured, composed principally of high molecular weight hydrocarbons, of which asphalts, tars, pitches, and asphalitites are typical. Asphalts are often classified as solids, semisolids, or liquids. They are often defined as the manufactured materials that are produced during petroleum processing. Asphalts characteristically contain very high molecular weight molecular polar species, called asphaltenes, which are soluble in carbon disulfide, pyridine, aromatic hydrocarbons, chlorinated hydrocarbons, and tetrahydrofuran (THF). Asphalts produced from the refining of petroleum have been used primarily in paving and roofing applications.

In one embodiment, natural gas condensate or condensate is a low-density mixture of hydrocarbon liquids that are present as gaseous components in the raw natural gas produced from many natural gas fields. In one embodiment, it condenses out of the raw gas if the temperature is reduced to below the hydrocarbon dew point temperature of the raw gas. In one embodiment, the natural gas condensate is also referred to as simply condensate, or gas condensate, or sometimes natural gasoline because it contains hydrocarbons within the gasoline boiling range. Raw natural gas may come from any one of three types of gas wells: In one embodiment, such as crude oil wells, raw natural gas that comes from crude oil wells is called associated gas. In one embodiment, this gas can exist separate from the crude oil in the underground formation, or dissolved in the crude oil. In one embodiment, such as dry gas wells, these wells typically produce only raw natural gas that does not contain any hydrocarbon liquids. In one embodiment, such gas is called non-associated gas. In one embodiment, such as condensate wells, these wells produce raw natural gas along with natural gas liquid. In one embodiment, Such gas is also non-associated gas and often referred to as wet gas.

A preferred rubber is at least a poly(conjugated diene). Exemplary conjugated diene contributed monomer units include 1,3-butadiene, isoprene, 2,3-dimethyl-1,3-butadiene, and 1,3-pentadiene. Preferred conjugated diene contributed monomer units are 1,3-butadiene and isoprene. The rubber may include more than one conjugated diene contributed monomer unit, such as, for example, the rubber may be a poly(1,3-butadiene-co-isoprene).

In addition, the rubber may also contain additional monomer contributed units. Exemplary monomer contributed units include vinyl-substituted aromatic hydrocarbons. Suitable vinyl-substituted aromatic hydrocarbons include styrene, α-methylstyrene, 1-vinylnaphthalene, 2-vinylnaphthalene, 1-α-methyl vinylnaphthalene, 2-α-methyl vinylnaphthalene, as well as alkyl, cycloalkyl, aryl, alkaryl, and aralkyl derivatives thereof, and di- or tri-vinyl aromatic hydrocarbons. A preferred vinyl-substituted aromatic hydrocarbon is styrene. The rubber is preferably any of poly(1,3-butadiene), styrene-butadiene diblock polymers, as well as any styrene-butadiene block or random polymers, and mixtures thereof.

Limonene is a colourless liquid hydrocarbon classified as a cyclic terpene possessing a strong smell of oranges. D-limonene has the structure as shown below:

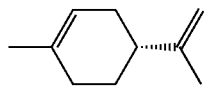

Limonene is a chiral molecule, and biological sources produce one enantiomer: the principal industrial source, citrus fruit, contains D-limonene ((+)-limonene), which is the (R)-enantiomer. Racemic limonene is known as dipentene [1]. D-Limonene is obtained commercially by extraction from orange peel with supercritical $CO_2$.

The term "effective," as that term is used in the specification and/or claims, means adequate to accomplish a desired, or hoped for result.

Figure 1:
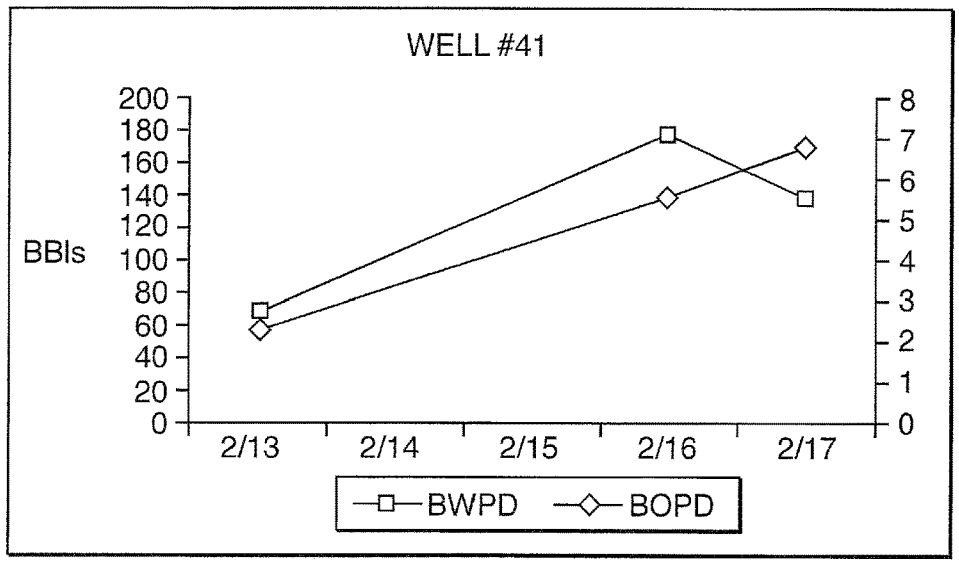
FIG. 1 shows a graphical representation of a well head 41 from the Kern River Field demonstrating a significant decrease in the viscosity, and an increase in the oil produced with the formulation.

Table 1 shows the viscosity of a crude oil sample with the addition of corresponding % of solution "A" from the present invention.

DESCRIPTION OF THE INVENTION

Crude oils of various composition and viscosities are hydrophobic and are difficult to remove due the high surface tension and the general insolubility with many inorganic and organic solvents. Detergent systems designed to reduce the surface tension have met with limited success; however, the resulting mixtures are often surface contaminants, or may cause rusting or other forms of corrosion. Generally, the solvents used to thin crude oil come form distillation fractions of crude oil, and carry the same toxic compounds present in the crude oil. In addition, these agents can destroy the integrity of the crude oil and its soluates, thus preventing the recovery and use of the materials removed. Further, these materials make it extremely difficult or impossible to recover the crude oil due to physical destruction of the crude.

There are several other needs for effective oil thinning agents. They are:

1. In Situ: There is a significant need for crude oil thinning in the geologic formation containing the oil. Approximately 40-60% of the available crude in a well is left due to viscosity and surface tension of the crude oil. The oil molecules "stick together" and on the surfaces of the formation, holding the oil back from flowing into the reservoir of the well. Oil wells are drilled into a geologic formation, which contains sufficient quantities of crude oil (or natural gas) to make it economically viable. Either a reservoir is present, or one is established to collect the crude oil so it can be pumped to the surface. Various technologies are used to "enhance" the oil to flow into the reservoir, including $CO_2$ injection under pressure, superheated steam, propane, detergents and acids, and forced air. Further, chemical and physical "fracing" (also called fraccing or fracking) or fracturing the formation is a common practice to open the formation for more oil to flow into the collection reservoir. There are major issues with the use detergents and acids because of the chemical alteration of the crude oil, and additional pollution. Similar issues exist with the use of superheated steam (water discharge), and the depletion of the water table.

Opponents of fraccing point to the negative impact on the environment and health, including contamination of ground water and the migration of gases and hydraulic fracturing chemicals to the surface, as well as surface contamination from spills. Importantly, the plant-derived formulations described herein can be an aid to fraccing, since they are non-toxic, thereby reducing the potential for environmental damage.

2. Oil or tar sands oil recovery. Current technologies use high superheated steam to force the oil to be released from the 'Mud" or sands. In most areas this is achieved by mining the oil mud, placing it on trucks, and carrying the mud to a processing site. No In Situ processing is conducted. Similar problems are created using steam for this use.

3. Crude oil transport via pipelines. Crude oil is transported from the well head to the storage area, refinery, or ship via large, heated pipes. Generally, the oil has been diluted with condensate (a hydrocarbon liquid/gas) present in all wells. The condensate gases are usually burned off, and the liquid is used to thin the crude. The amount of condensate to crude oil may be anywhere from very little condensate to as much as 50%. In some instances, a 50% blend of synthetic oil is added to reduce the viscosity and thus, the surface tension to allow oil to flow. Heat is always present in the transport pipes. Generally, the oil is heated to 90° C. to allow it to flow freely. This represents additional energy consumption to allow oil to flow. A corrosion inhibitor is always added (1-2%) to reduce the chemical attack of the crude on the pipeline walls.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As a result of the problems described, I was able to discover and perfect novel formulations which can be used to extract, retrieve and recover the following: Thin crude oils, oil based tar sands, and allow the recovery of crude oil from "oil rock" (oils impregnated or bound by sandstone or other naturally occurring aggregates with economically viable formulations that: a) require no heat, b) use no water, c) offer recovery of the formulations up to, and inclusive of 94% of the original amount used through physical or mechanical separation, d) convert to polyols if no recovery is required, e) are either the majority or completely biobased in content (non-toxic, thus non-polluting), f) combine readily with all types of crude oil, g) increase the well head yield of crude oil from 200-1,000%, h) free oil lodged in formations allowing total recovery of available oil reserves in a well from 50-60% to 80% plus, i). Separate oil from water based emulsions and mixtures, allowing greater oil recovery In one embodiment, the preferred chemistry comprises of a non-saponifiable cyclic monoterpene containing 2 isoprene units, with the "d" configuration, specifically d-limonene reacted with soy methyl esters and non-toxic glycol ether esters added in a specific sequence in the presence of an inorganic catalyst. (Other monoterpines including pinene, menthol, and turpentine, do not work, nor do additional isoprene units making up the sesquiterpenes, diterpines, triterpenes, and tetraterpenes respectively. The "L" forms of all structures, including l-limonene do not react to form the end products.)

The reaction is a series of endothermic reactions resulting in a clear, water white to hazy yellow thin liquid. Each of the reactants can be varied in concentration within limits in order to produce a slightly altered material formulated to achieve the specific functional result of thinning crude oil per environmental application (Injection or gravimetric application into the formation, injection (In situ or under pressure in the formation or reservoir), continuing drip or single charge into the reservoir application, or combining with the crude oil post well for transport, or spray or flooding on oil sands to release the bound oil.

The reaction steps are very specific. We tried other ways to react the materials but the end product did not work very well.

Preferred Embodiments: Reaction Sequence

In one embodiment, 30-35% or even 30-45% (by weight) of d-limonene is placed in a stainless steel reactor. An inorganic (e.g. iron/copper) catalyst is suspended in the solution. Note: the catalyst must extend to the full length of the reactant results (it has got to be as long as the tank or vessel). In one embodiment, the reaction must be run in a stainless or other steel tank in order to set up an electrolytic reaction between the dissimilar metals. We have repeatedly try to achieve the same results in glass and plastic containers with just the copper catalyst, the results are solutions that don't work any where near as well on oil thinning. When we add a steel rod, strip, or other source of steel to the glass or plastic vessel, we get great end product that works well. A 30-35% addition of soy methyl esters (methyl soyate derived from soybean oil) is added and the resulting mixture is stirred at 1700-3500 rpm for 30 minutes. The reactor must be grounded.

The intermediate solution will gradually change color from a clear to slightly yellow color to a golden yellow, have a pH of between 4.0-5.0 depending on the specific ratio of the two starting materials. A slight haze will form in the solution.

Glycol ether esters are the added (to make up the balance) and the solution is stirred (in the presence of the catalysts) for 1 hour or until the solution clears. In one embodiment, The temperature of the final solution will be at least 10 degrees lower than the surrounding ambient conditions.
Physical and Chemical Properties: (at STP)
pH: 4.3-4.8
Specific gravity: 0.8810-0.8900 (water=1.000)
Density: 7.09-7.10 #/US Gallon
Surface tension: 10.5-11 dynes/cm$^2$
Odor: Aromatic, sweet fruity
Boiling Point: 185-190° F.
Flash Point: 140° F. (Tag Closed Cup), 70° F. (Penske, open cup)
Solubility in water: Insoluble
Oil Thinning A ratio of 30% d-limonene, 30% methyl soyates, 40% glycol ether esters applied to heavy crude oil at STP, having a viscosity of 22,500 cTs.

Start viscosity of Crude Oil 22,500 (all applications done on a weight/weight basis, mixed for 2 minutes by hand) the viscosity results are shown in Table 1.

Crude oil cannot be efficiently pumped through pipelines unless the viscosity is reduced to a minimum high measurement of 350 cTs. This is the international standard used for all pipeline transport of crude oil. The viscosity is lowered with the assistance of heat and the inclusion of condensates.

The attached study performed by (Enbridge) clearly describes the performance of the solution, which includes the variable range of raw reactants. Formula "A" is the final formulation which uses the Bituminous Substance Removal formulation as a primary building block of the cyclic monoterpene and the surfactant, The addition of the other primary raw materials previously identified in this document are essential for the viscosity and surface tension reduction to occur.

A study performed on a sample of crude oil obtained from Cushing, Oklahoma was evaluated using "formula A" for viscosity reduction, recovery of the solution, and surface tension. The results are as follows:

| Original viscosity | 4,500 cTs | surface tension: | 31 dynes/cm$^2$ |
|---|---|---|---|
| Add 3.5% "A" | 375 cTs | surface tension: | 18 dynes/cm$^2$ |

Oil Thinning Agent-Distillation/Recovery

The following steps were used to recover up to 94% of the original Solution. A simple. Low temperature distillation of the oil/solution mixture was employed. Water was removed by one of two methods. The first method was tested at a well site in OK.

The first method used a simple skimming operation whereby the crude oil/our formula "A" mixture was separated from the water phase by gravimetric separation. The oil phase always floats above the water phase. When this method was utilized, our material helped separate the phases significantly better than all other separation methods, and helped remove suspended salts from the crude.

The second method was performed in a laboratory. This method used simple centrifugation, whereby the crude oil/formulation "A" mixture was separated from the water phase. The problem with centrifugation is that there was some oil/"formulation "A" loss, and the residual fluid was processed through a gravimetric separator to eliminate toxic material discharge back into the watershed.

Once the oil/formulations "A", "B", and "C" were separated from the water phase, a low temperature, simple distillation/condensing recovery system was used to separate the crude oil from the oil phase. A mean temperature of less than 150° C. allowed intact recovery of almost all of the formulations. Recovery averages ranged from a low of 85% (Formulation "C") to a High of 97%+ (Formulation "A"). Mean recovery levels of 94% were the target level, with solutions "A and B" were recovered and tested for reuse in thinning fresh crude.

Experimental Field Results

The study of formulation "A", referred to as AR-OT demonstrates the increased flow of crude oil from the well following the introduction of our material. The data, following a 1 month experimental trial, speaks for itself with the increased output derived in situ.

Figure 2:
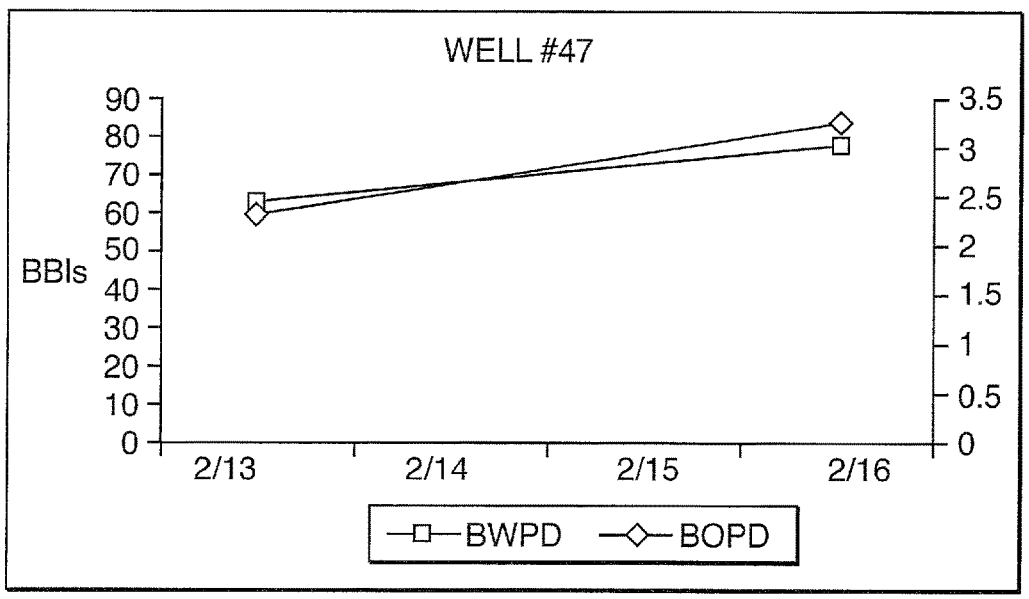
FIG. 2 shows a graphical representation of a well head 47 from the Kern River Field demonstrating a significant decrease in the viscosity, and an increase in the oil produced with the formulation.
Figure 3:
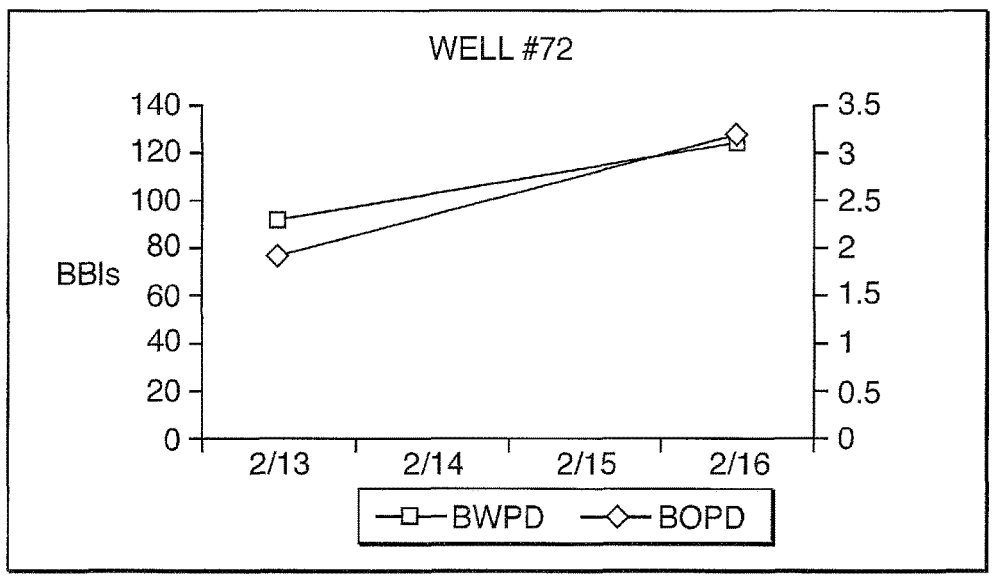
FIG. 3 shows a graphical representation of a well head 72 from the Kern River Field demonstrating a significant decrease in the viscosity, and an increase in the oil produced with the formulation.

Well head studies on wells #37, 41, 47-72 from the Kern River Field demonstrate a significant decrease in the viscosity, and an increase in the oil produced with the formulation (shown in FIG. 1, FIG. 2, and FIG. 3).

The Glen Rose study and the Mega West data on "Prodigen X (which is Formulation "A"), clearly shows the significant improvements in flow and stem injection in the wells and in the formation with the use of our material.

Figure 4:
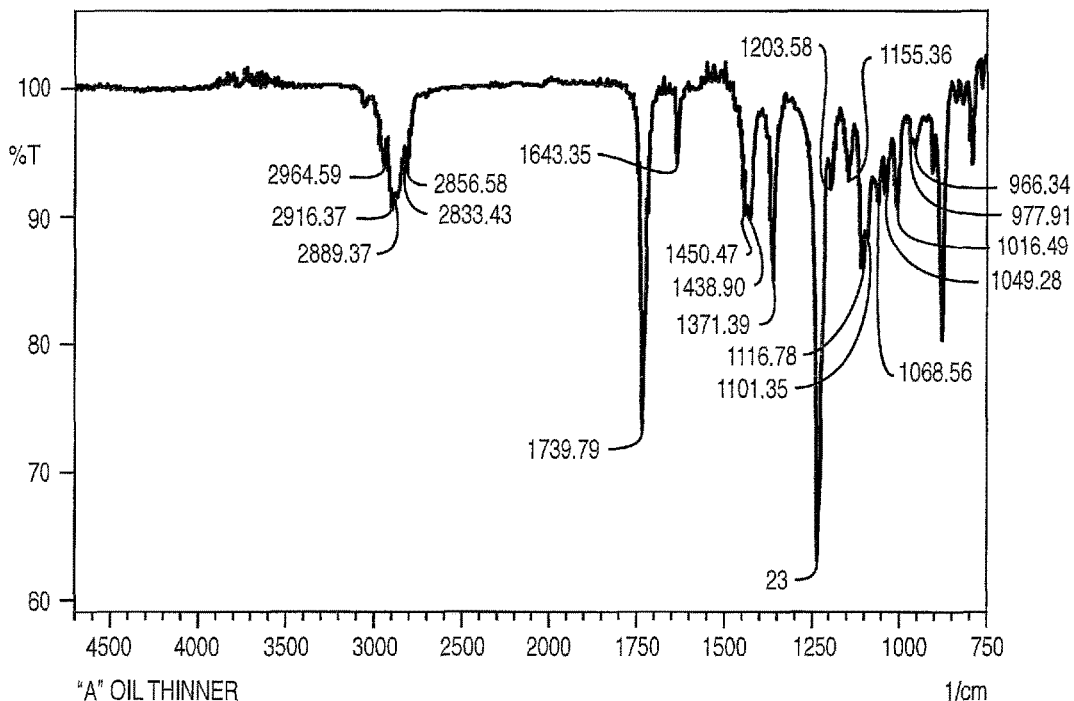
FIG. 4 shows an FTIR spectrum analysis of the Formula "A" also known as Prodigen X.
Figure 5:
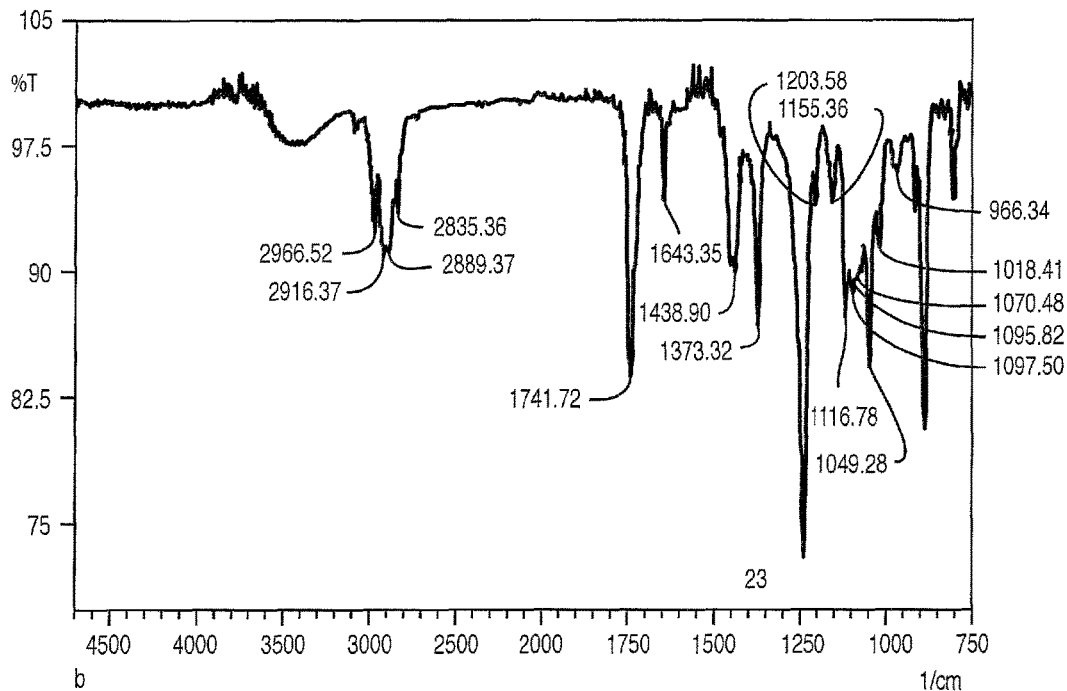
FIG. 5 shows an FTIR spectrum analysis of the Formula "B"
Figure 6:
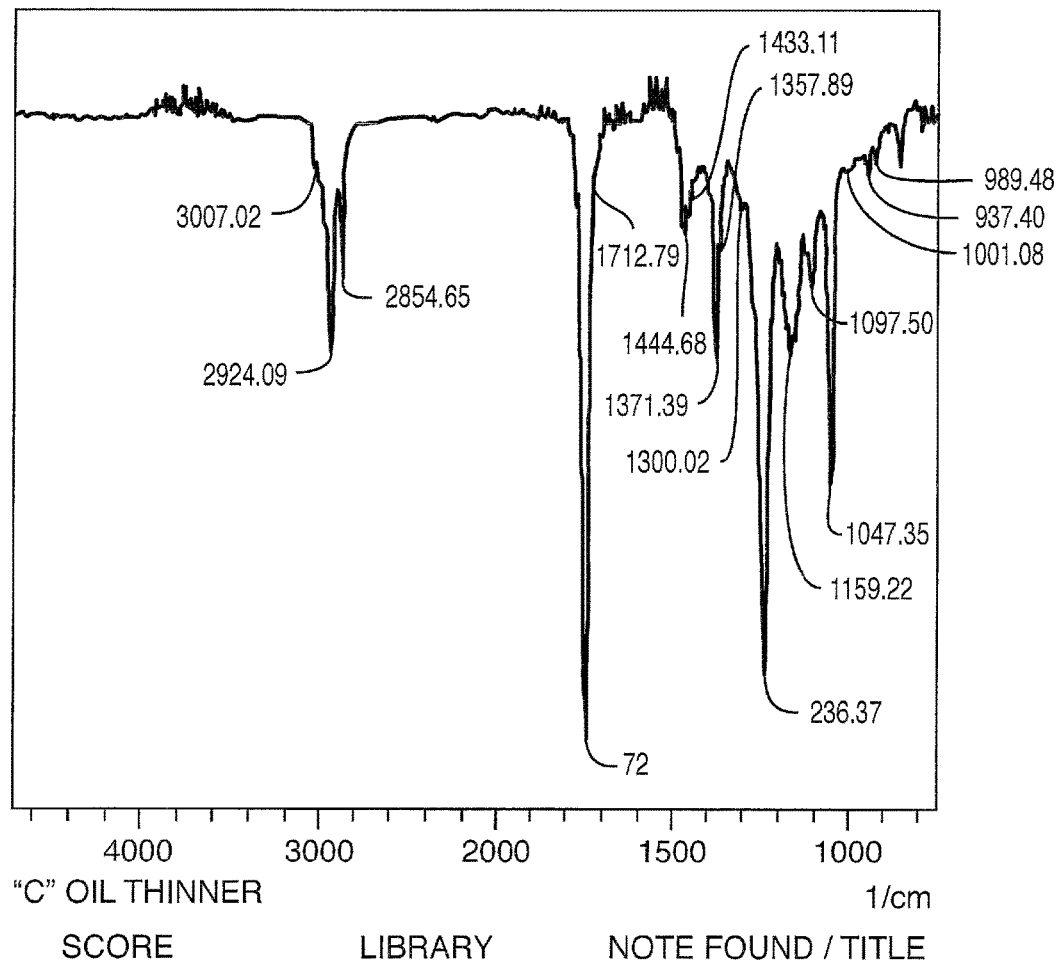
FIG. 6 shows an FTIR spectrum analysis of the Formula "C"
Figure 7:
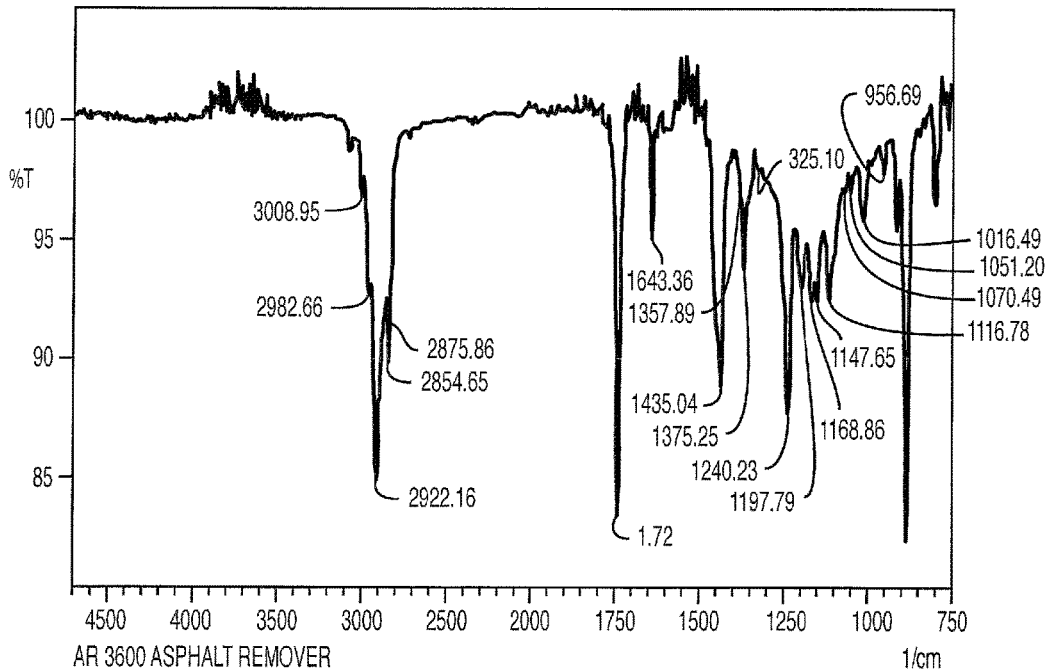
FIG. 7 shows an FTIR spectrum analysis of the AR 3600 asphalt remover.

FT-IR scans of Formulation "A," "B," and "C" (shown in FIG. 4, FIG. 5, and FIG. 6, respectively) attached and a scan of AR3600 (Bituminous Substance Removal product), shown in FIG. 7 is included for comparative use.

Samples of raw MacKay River Bitumen (MKB), and Cold Lake heavy crude oil were provided by Enbridge for evaluation and testing. Condensate was also supplied since this is used as the primary diluent Synthetic oil was not supplied The primary objective with the MacKay River Bitumen were to reduce the viscosity of the MKB with a limited amount of BioSpan material, eliminating the need to heat the bitumen to 90° C. for transport to the blending facility where it is blended with a synthetic oil at a 50:50 ratio, and to further reduce the amount of diluent to achieve a target of 350 centistokes at a temperature of 11.9° C.

The second set of objectives were to reduce the Cold Lake blended crude viscosity below 350 cSt with a small amount of the same BioSpan solution used to reduce the viscosity of the MKB, if possible.

There were secondary objectives as follows:
1. Reduce, or eliminate the need for corrosion inhibitors added to the crude oil flowing through the pipelines.
2. Be able to recover the BioSpan diluent solution at a minimal 80% level, with 85-90% recovery preferred.
3. Maintain the NON-TOXIC nature of the BioSpan solution(s).
4. Reduce the toxicity of the final diluent when condensate is incorporated into the formulation
5. Availability of raw materials to meet demand.

Experimental Laboratory Methods:

All testing was conducted using currently accepted scientific methods. Hot and cold water bath were used to maintain constant temperature during testing. A Brookfield viscometer was used to measure viscosity and a distillation set u was used to replicate the initial recovery of the BioSpan Material at the refinery or other processing facility. GC/MS was used to determine if there were any changes in the chemical structure, comparing the recovered crude or bitumen versus the undiluted material, and the BioSpan solution(s). A Hewlett Packard 5988A GC/MS was used. Initial substrate compatibility was evaluated using black steel pipe following an accepted FDA protocol for corrosion resistance.

Over 60 different formulation modifications were evaluated for MKB viscosity reduction, staring at a temperature of 90° C., and sequentially reducing the temperature by 10° C. on those formulations expressing significant viscosity reduction as the temperature was reduced. The concentration level of test solutions started at 10% and was adjuste dupwar to reach the end point goals of the project It was our goal to incorporate the condensate as part of the diluent, since this material is already been recovered and must be disposed of.

Condensate diluent was used at the 70% MKB: 30% condensate level as a standard.

Final testing and all other analysis were performed once the 11.9° C. viscosity level was achieved on the MKB samples. Recovery of the BioSpan diluent was done on these materials, as were the GC/MS tests.

Similar testing was performed on the Cold Lake material, but at a much lower level, since our target was to come up with a diluent reducer, or replacement.

All testing was done on a weight/weight basis.

Results:
1. Three formulations demonstrated that the targeted viscosity of 350 cSt or less is achievable at 11.9° C.
2. The amount of BioSpan material to achieve this goal ranges from 11.45% to 18.0%.
3. Condensate may be combined with BioSpan materials at a ratio of 50:50 or higher depending on the desired viscosity/temperature ratio.
4. All formulations tested are completely hydrophobic.
5. All formulations are recoverable at a range of 85% or higher.

Formula "A"

Formula "A" is a non-toxic formulation that eliminates the need for condensate. An 18% (by weight) use level of Formula "A" completely solubilizes MKB at 19° C. resulting in a viscosity of 200-225 cSt, and at 11.9° C. the viscosity was 250-275 cSt. Solubilization speed is much better than other formulations. Slightly increased temperatures of between 30 and 40° C. result in almost immediate dissolution. At 60° C., the dissolution is immediate, with little or no agitation needed.

Distillation recovery of this formulation is between 90 and 94% with no apparent change in the structure. The formulation is a corrosion protectant, and a version of the base formulation is marked for this use on salt trucks and other heavy equipment exposed to chlorides and moisture.

Serial reductions of this formulation at a ratio of 1 part "A" to 3 parts condensate provides a similar viscosity reduction level with MKB; however, a linear increase in mixing temperature is necessary to easily combine the diluent since the initial solubility of the condensate/Formulat "A" is not as quick at 11.9° C. as a straight Formula "A." Toxicity becomes an issue when condensate is combined with Formula "A" due to the inherent nature of the condensate.

An equal blend of Formula "A" and condensate at the 9% concentration level of each came closest to using a 18% concentration of Formula "A."

Formula "B"

Formula "B" is a modification of Formula "A." The use level of this formulation is approximately 15%, with a 15% addition of condensate. It rapidly solubilizes the MKB at 50° C. The viscosity at 11.9° C. is 350 cST, and has similar (but not quite as good as Formula "A") corrosion protection characteristics. The ratio of Formula "B" to condensate is roughly 1:4. The base solution is non-toxic, but will exhibit similar toxicity characteristics as "A" when combined with condensate.

One advantage is that it reduces the viscosity of the Cold Lake material to ~250 cSt with a 3-4% addition at 11.9° C. It mixes immediately into a uniform liquid and is recoverable at a rate of approximately 85-90%. No significant observable changes were seen on the GC/MS scans. Formula "C"

Formula "C" has a different formula than "A or B." It is non-toxic, but has a higher boiling point that the other two formulations. At a use concentration of 11.45%, the viscosity measured 350 cSt, at 19° C. When the temperature was lowered to 11.9° C., the viscosity jumped to almost 500 cSt. We attempted to reduce the viscosity by altering the formulation components without success; however this formulation did combine with the Cold Lake samples reducing the viscosity to 300 cSt with a 5% addition to the Cold Lake product. Recovery through distillation was as the 80-85% level.

CONCLUSIONS

1. Of the 67 formulations evaluated under the criteria set forth by Enbridge, three (3) formulations were identified as potential candidates that met most, if not all the performance needs.
2. Formulat "A" met all the criteria set forth this far. It is non-toxic, equipment friendly, environmentally friendly, and does not alter the structural integrity of the crude oil while liquefying the MKB, and reducing the viscosity of the Cold Lake material. It is recoverable, and may be reusable if desired. It combines readily with condensate, and the resulting mixture offers a significant energy savings by reducing the need for elevated temperature when liquefying the MKB. Sufficient raw materials are available to keep us with demand, and provide secondary benefits in maintaining the pipelines with reduced corrosion.
3. Formula "B" provided similar results as Formula "A" but used more materials and requires a higher mix temperature. It combines readily with the Cold Lake crude, and sufficient raw materials are available to meet future needs. It is recoverable without significant changes to the integrity of the crude. It mixes with condensate, but requires more condensate use than Formula "A" to achieve similar results.
4. Formula "C" offers the lowest use concentration, but requires higher mix temperatures and does not provide the same kind of corrosion protection as the other formulations. Of the three, this formulation would require additional extensive research on MKB in order to achieve the desired performance characteristics.

REFERENCES

1. Simonsen, J. L. (1947) *The Terpenes*, Vol. 1, 2nd ed., Cambridge University Press.

TABLE 1

| Viscosity | % Solution |
|---|---|
| 22,500 | 0.00 |
| 19,500 | 1.00 |
| 17,600 | 1.50 |
| 15,900 | 2.00 |
| 14,700 | 2.50 |
| 12,300 | 3.00 |
| 11,000 | 3.50 |
| 9,500 | 4.00 |
| 8,000 | 4.50 |
| 6,770 | 5.00 |
| 5,100 | 5.50 |
| 4,000 | 6.00 |
| 2,950 | 6.50 |
| 1,800 | 7.00 |
| 950 | 7.50 |
| 951 | 8.00 |
| 952 | 8.50 |
| 270 | 9.00 |

I claim:

1. A formulation comprising a first reaction product of a reaction mixture of one or more terpenoid compounds, soy methyl esters, and a first inorganic catalyst comprising copper in the presence of iron.
2. A composition comprising the reaction product of a reaction mixture of the formulation of claim 1, one or more glycol ether esters and a second inorganic catalyst comprising copper in the presence of iron.
3. The formulation composition of claim 2, wherein approximately 30-45 weight percent of said one or more terpenoid compounds, approximately 30-45 weight percent of said methyl esters, and about 20-30 weight percent of said glycol ether esters is used.
4. A formulation consisting essentially of the reaction product of a reaction mixture of one or more terpenoid compounds, soy methyl esters, and a first inorganic catalyst comprising copper in the presence of iron.
5. A composition comprising the reaction product of a reaction mixture of the formulation of claim 4, one or more glycol ether esters and a second inorganic catalyst comprising copper in the presence of iron.

* * * * *